United States Patent
Yeh et al.

(10) Patent No.: US 10,631,057 B2
(45) Date of Patent: Apr. 21, 2020

(54) SYSTEM AND METHOD FOR NATURAL LANGUAGE DRIVEN SEARCH AND DISCOVERY IN LARGE DATA SOURCES

(71) Applicant: Nuance Communications, Inc., Burlington, MA (US)

(72) Inventors: Peter Yeh, Milpitas, CA (US); William Jarrold, San Francisco, CA (US); Adwait Ratnaparkhi, San Jose, CA (US); Deepak Ramachandran, Sunnyvale, CA (US); Peter Patel-Schneider, Westfield, NJ (US); Benjamin Douglas, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 566 days.

(21) Appl. No.: 14/808,354

(22) Filed: Jul. 24, 2015

(65) Prior Publication Data
US 2017/0026705 A1   Jan. 26, 2017

(51) Int. Cl.
*G06F 16/33*   (2019.01)
*H04N 21/482*   (2011.01)
(Continued)

(52) U.S. Cl.
CPC ..... *H04N 21/4828* (2013.01); *G06F 16/3329* (2019.01); *G06F 16/7343* (2019.01);
(Continued)

(58) Field of Classification Search
CPC ......... G06F 17/30401; G06F 17/30684; G06F 16/3329; G06F 16/243; G06F 3/167;
(Continued)

(56) References Cited

U.S. PATENT DOCUMENTS 7,693,705 B1 * 4/2010 Jamieson .............. G06F 17/211
704/1
9,070,366 B1   6/2015 Mathias
(Continued)

FOREIGN PATENT DOCUMENTS

EP   2648137 A2   10/2013
WO   2006014824   2/2006

OTHER PUBLICATIONS

Yeh et al. "A Speech-Driven Second Screen Application for TV Program discovery" Jun. 10, 2014, Association for the Advancement of Artificial Intelligence.*
(Continued)

*Primary Examiner* — Etienne P Leroux
*Assistant Examiner* — Cindy Nguyen
(74) *Attorney, Agent, or Firm* — Hamilton, Brook, Smith & Reynolds, P.C.

(57) ABSTRACT

Presenting natural-language-understanding (NLU) results can include redundancies and awkward sentence structures. In an embodiment of the present invention, a method includes, responsive to receiving a result to a NLU query, loading a matching template of a plurality of templates stored in a memory. Each template has mask fields associated with at least one property. The method compares the properties of the mask fields of each of the templates to properties of the query and properties of the result, and selects the matching template. The method further completes the matching template by inserting fields of the result into corresponding mask fields of the matching template. The method may further suppress certain mask fields of the matching template to increase brevity and improve the naturalness of the response when appropriate based on the results of the NLU query. The method further presents the completed matching template to a user via a display.

20 Claims, 10 Drawing Sheets

(51) Int. Cl.

| | | |
|---|---|---|
| *H04N 21/466* | (2011.01) | |
| *H04N 21/422* | (2011.01) | |
| *H04N 21/4722* | (2011.01) | |
| *G06F 17/27* | (2006.01) | |
| *G06F 16/78* | (2019.01) | |
| *H04N 21/41* | (2011.01) | |
| *G06F 16/332* | (2019.01) | |
| *G06F 16/732* | (2019.01) | |

(52) U.S. Cl.
CPC ............ *G06F 16/78* (2019.01); *G06F 17/278* (2013.01); *G06F 17/2785* (2013.01); *H04N 21/4126* (2013.01); *H04N 21/42203* (2013.01); *H04N 21/4665* (2013.01); *H04N 21/4722* (2013.01); *H04N 21/4821* (2013.01); *H04N 21/4826* (2013.01)

(58) Field of Classification Search
CPC ............... G06F 16/3344; G06F 16/248; G06F 16/90332; G06F 16/338
See application file for complete search history.

(56) References Cited

U.S. PATENT DOCUMENTS

| | | | |
|---|---|---|---|
| 2004/0148170 A1 | 7/2004 | Acero | |
| 2006/0053096 A1 | 3/2006 | Subramanian | |
| 2007/0124263 A1 | 5/2007 | Sanjeev | |
| 2009/0327343 A1 | 12/2009 | McCormack | |
| 2011/0087629 A1 | 4/2011 | Reza | |
| 2011/0314375 A1 | 12/2011 | Zaika | |
| 2013/0132434 A1* | 5/2013 | Scofield | G08G 1/0112 707/771 |
| 2013/0325164 A1 | 12/2013 | Gruber | |
| 2014/0025705 A1 | 1/2014 | Barve | |
| 2014/0244712 A1 | 8/2014 | Walters | |
| 2015/0161521 A1* | 6/2015 | Shah | G06F 17/278 706/12 |
| 2015/0261745 A1* | 9/2015 | Song | G06F 17/2881 704/9 |
| 2015/0379013 A1 | 12/2015 | Purcell | |
| 2016/0041967 A1* | 2/2016 | Ghannam | G06F 17/2785 704/9 |
| 2016/0180840 A1 | 6/2016 | Siddiq | |
| 2017/0024465 A1 | 1/2017 | Yeh et al. | |
| 2017/0186429 A1 | 6/2017 | Guili | |
| 2017/0199928 A1 | 7/2017 | Zhao | |

OTHER PUBLICATIONS

Liu, J., et al. "A Conversational Movie Search System Based on Conditional Random Fields", MIT Computer Science & Artificial Intelligence Laboratory, Cambridge, MA, Interspeech. 2012.
Greenstein, Alexander, and Stephanie Seneff. "Releasing a multimodal dialogue system into the wild: User support mechanisms." Proc. of the 8th SIGdial Workshop on Discourse and Dialogue. 2007.
Liu, J., "A Dialogue System for Accessing Drug Reviews" MIT Computer Science & Artificial Intelligence Laboratory, Cambridge, MA , Automatic Speech Recognition and Understanding (ASRU), 2011 IEEE Workshop on. IEEE, 2011.
Lafferty, J.,. "Conditional Random Fields: Probabilistic Models for Segmenting and Labeling Sequence Data", Proceedings of the 18th International Conference on Machine Learning, pp. 282-289, Jun. 2011.
Li, S., et al. "Understanding the Semantic Structure of Noun Phrase Queries", Microsoft Research, Proceedings of the 48th Annual Meeting of the Association for Computational Linguistics, Association for Computational Linguistics, 2010.
Liu, Jingjing, et al. "Lexicon modeling for query understanding." Acoustics, Speech and Signal Processing (ICASSP), 2011 IEEE International Conference on. IEEE, 2011.
Blei, D.M., "Latent Dirichlet Allocation", Journal of Machine Learning Research 3, 993-1022, 2003.
Glass, J. "A Probabilistic Framework for Segment-Based Speech Recognition", Computer Speech and Language, 17, 137-152, 2003.
Gruenstein, A.,et al., "The WAMI toolkit for developing, deploying, and evaluating web-accessible multimodal interfaces." Proceedings of the 10th international conference on Multimodal interfaces. ACM, 2008.
McGraw, Ian, et al. "Automating Crowd-supervised Learning for Spoken Language Systems." Interspeech. 2012.
Bobrow, Danny, et al. "A basic logic for textual inference." Proceedings of the AAAI Workshop on Inference for Textual Question Answering. 2005.
Borthwick, Andrew, et al. "Exploiting diverse knowledge sources via maximum entropy in named entity recognition." Proc. of the Sixth Workshop on Very Large Corpora. vol. 182. 1998.
Crouch, Dick, and Tracy Holloway King. "Semantics via f-structure rewriting." Proceedings of the LFG06 Conference. 2006.
Gatt, Albert, and Ehud Reiter, "SimpleNLG: A realisation engine for practical applications." Proceedings of the 12th European Workshop on Natural Language Generation. Association for Computational Linguistics, 2009.
Kate, R., et al, "Learning to transform natural to formal languages," Proceedings of the National Conference on Artificial Intelligence. vol. 20. No. 3. Menlo Park, CA; Cambridge, MA; London; AAAI Press; MIT Press; 1999, 2005.
Maxwell, John T., and Ronald. M. Kaplan. "The interface between phrasal and functional constraints." Computational Linguistics 19.4 (1993): 571-590.
Miller, George A. "WordNet: a lexical database for English," Communications of the ACM 38.11 (1995): 39-41.
Popescu, A., et al., "Towards a theory of natural language interfaces to databases." Proceedings of the 8th international conference on Intelligent user interfaces. ACM, 2003.
Ratnaparkhi, Adwait. "A maximum entropy model for part-of-speech tagging." Proceedings of the conference on empirical methods in natural language processing. vol. 1. 1996.
Zelle, John M., and Raymond J. Mooney. "Learning to parse database queries using inductive logic programming." Proceedings of the national conference on artificial intelligence. 1996.
Non-Final Office Action dated Sep. 22, 2017 for U.S. Appl. No. 14/808,349.
Final Office Action dated May 3, 2018 for U.S. Appl. No. 14/808,349.
International Search Report for PCT/US2018/055860 dated Feb. 4, 2019, titled "System and Method for Contextual Reasoning".
Fujino, T., et al., "A SPARQL Query Rewriting Approach on Heterogeneous Ontologies with Mapping Reliability", 2012 IIAI International Conference on Advanced Applied Informatics, pp. 230-235, Sep. 1, 2012.
Rivero, C.R., et al., "A Reference Architecture for Building Semantic-Web Mediators", In: "Serious Games", Jan. 1, 2011.

* cited by examiner

SYSTEM AND METHOD FOR NATURAL LANGUAGE DRIVEN SEARCH AND DISCOVERY IN LARGE DATA SOURCES

BACKGROUND

An increase of availability of content (e.g. movies, TV shows, sporting events, etc.) available on television coupled with an increased use of mobile devices (e.g., smart phones and tablets) has created significant interest, such as from both end-users and content providers in second screen applications. Second screen applications enrich the television viewing experience in numerous ways, such as helping end-users effectively find and control content on television via spoken natural language (e.g., speech driven TV program discovery).

SUMMARY

Speech-driven TV program discovery applications have recently become available in the marketplace from select cable/satellite providers. However, these applications are limited to a set of pre-defined utterance types (e.g. in these existing systems, switch to <channel>, find a <genre> movie, or find a movie with <actor>). Hence, end-users must conform to these pre-defined utterance types, and cannot combine them in an ad hoc manner (e.g., simultaneously searching by genre, actor, and TV station with one command).

"*A Conversational Movie Search System Based On Conditional Random Fields*," Liu et al. 2012, Interspeech, (hereinafter "Liu"), which is incorporated by reference in its entirety, informs focus on a small piece of the overall problem (e.g., entity recognition), but does not support the full range of features required of an end-to-end system. For example, the prototypes of Liu do not, for example: (1) support question answering (e.g., who is the French actress in the movie The Dark Knight); (2) handle expressive utterances involving conjunction, disjunction, and negation (e.g. find a movie without Tom Cruise and Nicole Kidman); or (3) handle complexities of searching and controlling "live" television.

In an embodiment of the present invention, and end-to-end speech-driven second screen application is provided for television program discovery that addresses these limitations. Embodiments of the present invention integrate the following Artificial Intelligence (AI) and Natural Language (NL) technologies:

(1) Statistical and linguistic-based natural language understanding technologies to construct a rich semantic representation of the end-user's utterance. Such technologies are informed by, for example, "*A Maximum Entropy Model For Part-Of-Speech Tagging*," Ratnaparkhi, 1996, Proceedings of the Conference on Empirical Methods in Natural Language Processing, 133-142 (hereinafter "Ratnaparkhi") and "*The Interface Between Phrasal and Functional Constraints*." Maxwell et al., 1993, Computational Linguistics 19:571-589 (hereinafter "Maxwell"), which are incorporated by reference in their entirety.

(2) A large-scale common sense knowledge-base as the target output of linguistic processing and supports SQL query generation.

(3) Techniques from Natural Language Interface to Databases (NLIDB) to transform the output of linguistic processing into a SQL query to execute against a commercial Electronic Program Guide (EPG) database that is updated on a daily basis. "*Towards a Theory of Natural Language Interfaces to Databases*," Popescu et al. 2003, *IUI*, (hereinafter "Popescu") which is incorporated by reference in its entirety, informs some NLIDB technologies.

NL generation technologies to summarize and confirm the outcome of acting on the end user's utterance. "*SimpleNLG: A Realisation Engine For Practical Applications*" Gatt et al., 2009, Proceedings of ENLG-2009 (hereinafter "Gatt"), which is incorporated by reference in its entirety, informs some NL generation technologies.

In an embodiment of the present invention, when a user starts the application for the first time, the application prompts the user for his/her zip code and cable/satellite provider. The application uses this information to limit/filter all results to the user's provider and viewing area. The application then displays a screen with a speech icon, selectable by the user, which commences the application's recording the user's speech.

If the user's utterance is a search request (e.g., watch an action movie tonight, or find a movie with Tom Hanks), then the application displays all relevant results (e.g., ordered/sorted by start time) along with a confirmation of these results in the prompt box. The user can scroll through these results, and tap on any one to view additional details such as the program synopsis, cast, ratings, etc. The user can also tap on the speech icon to issue additional utterances.

If the utterance is a question (e.g., where was Tom Cruise born?), then the application displays the corresponding answer (i.e., Syracuse, N.Y.) in a prompt box. The application also displays any programs relevant to the question, such as any Tom Cruise movies or TV shows that are playing. If the utterance is a command (e.g., change channel, increase volume, etc.), then the application executes the command. For channel change commands, the application also displays the programs that are currently showing on the new channel.

The application prompts the user accordingly for utterances that it does not understand. Table 1 shows a sample of utterance types supported by the application.

TABLE 1

Samples of supported utterances

| Utterance Type | Example |
| --- | --- |
| Search: Multi-Slot | Action movies with Tom Cruise playing tonight. |
| Search: Hi-Precision | Find a French movie with a British actor. |
| Search: Logical Expression | Watch action movies without Tom Cruise or Bruce Willis. |
| WH-Question | Who directed the Dark Knight? Where was Terminator filmed? |
| Command | Switch to HBO. |

Therefore, embodiments of the present invention can perform an NLU search of large data sources. Embodiments of the present invention can further generate NLU explanations of results/outcomes of the searches.

In an example embodiment, an application of the present invention is media (e.g., TV Program, movies) discovery. When a user wants to find content on TV, the user performs a NLU search. The embodiment responsively presents the user with media options in addition to other information (e.g., actors, genre, year aired) to aid in selection. A person of ordinary skill in the art can recognize that embodiments of the present search system can be applied to other applications outside of media, such as car feature searches, website searches, music searches, searches for points of interest within an automobile, etc.

In an embodiment, the present invention may employ a full linguistic parser with a back-end database to retrieve results from a television database (e.g., electronic program guide). Current systems can identify an entity that a user directly mentions in a natural language request, however, current systems cannot perform translation across multiple processing modules and data sources as described. The embodiment provides a shared semantic representation based on common information/knowledge sources across multiple processing components. Multiple processing components employ a common representation of the content being processed. The representation of content may be common across all modules, processing components, and data sources, based on ontologies—formal representations of content.

The system may also employ semantic abstraction. Many times, there is a gap between what user said and what is stored in a backend database. An embodiment captures mapping between linguistic elements and database query fragments in a domain of interest. The system converts the output of linguistic processing into a query to run against databases to generate a result.

The system may further allow additional components or databases to be added to the system by interfacing through the shared representation and semantic abstraction, respectively. Components in embodiments adhere to ontology standards to be added in a plug-and-play manner.

The system further generates a multi-tiered linguistic output during the formulation of a database query. Prior systems may interpret the request "I want to watch a movie with Tom Cruise" by extracting "Tom Cruise" as a person, but not other information in the request, like the word "movie." Such a request, based on its wording, implies the user wants to watch a movie showing Tom Cruise on the screen (e.g., where Tom Cruise is an actor), not a movie where Tom Cruise is affiliated as a director or executive producer but not an actor, for instance. In one embodiment, one component can detect that Tom Cruise is a person/actor. Other components extract relationships between the entities. For example, the phrase "with Tom Cruise" implies that the user wants a movie where Tom Cruise is an actor, but the phrase "by Tom Cruise" implies that the user wants a movie in which Tom Cruise is a director or writer, but not necessarily an actor. Information from one linguistic component can further be overridden by other linguistic components. "Cruising with Tom" might override another component detecting "Tom Cruise."

The system may further generate a database query without use of pre-defined templates. Prior systems employ pre-defined templates to be instantiated. Queries are dynamically generated based on output of semantic processing. Query generation allows for logical connectors like negations or conjunctions in WH-type questions (e.g., who, what, where, why).

The system may further employ a target domain that organizes indices around semantic abstractions from a knowledge source such as an ontology. The index can be a look up table (LUT). The index can have two entries—(1) Name of element and (2) ID of the element. The look up table is configured to allow "fuzzy match" of an ID, such that multiple forms of the name of the element return the same ID. For example, three inputs, Tom Cruise, Tom M Cruise, and Thomas Cruise, all return the Same ID despite the slight variations of the name.

The system can also query additional information/knowledge sources to resolve mismatches that may occur in generating the query. For example, the request "I want to watch an Asian movie" usually means "I want to watch a movie produced in Japan, China, Korea, etc." In other words, the data sources may include country of origin of each movie, but not continent. Therefore, the request has to be broken down into individual countries. This means that the system has to extract the countries within Asia from a knowledge base by querying an ontology populated with relationships about world facts, and include this information in the query.

The system can further dynamically modify/transform an output template based on the outcome of executing a query against a database. The templates give a more customized response to the user's input.

Based on the output of the database lookup, results can include directors, shows, etc. The results are masked in the template based on which variable is to be filled. The best template is selected based on the variables found and compared to a template.

In an embodiment, a computer-implemented method includes, responsive to receiving a result to a query, loading a matching template of a plurality of templates stored in a memory. Each template has mask fields associated with at least one property. The method compares the properties of the mask fields of each of the templates to properties of the query and properties of the result, and selects the matching template. The method further completes the matching template by inserting fields of the result into corresponding mask fields of the matching template. The method may also suppress some of the fields of the matching template based on the results of the query to increase brevity and to make the response sound more natural. The method further presents the completed matching template to a user via a display.

In an embodiment, the properties of the result correspond with respective fields of the result. Properties of the query can correspond with respective fields of the query.

In an embodiment, comparing includes assigning a score to the properties of the mask fields respective to properties of the query and properties of the result, combining the scores of the mask fields of each of the templates, and selecting the matching template being the highest scoring template of the templates.

In an embodiment, the method further includes suppressing redundant or extraneous information presented in the completed matching template. Suppressing redundant or extraneous information can further include identifying redundant information in the result and identifying a matching template using the identified redundant information once. In an embodiment, loading the matching template includes providing a score bonus to templates suppressing redundant information in the result. Suppressing redundant or extraneous information can also include not inserting fields of the result into corresponding mask fields of the matching template if the fields of the results contain a multitude of values that are deemed to be extraneous. For example, a field in the results for a query contains all possible values for the field. Suppressing redundant information can further include blocking insertion of a field of the result into the corresponding masked field of the matching template when the values of the blocked field of the result is determined to contain information above a particular threshold. Information above a particular threshold can overwhelm the user, such that blocking it provides a better user experience.

In an embodiment, a computer system can include a processor and a memory with computer code instructions stored thereon. The processor and the memory, with the computer code instructions being configured to implement a template matching module configured to load, responsive to receiving a result to a query, a matching template of a plurality of templates stored in a memory. Each of the templates having mask fields associated with at least one property. The template matching module is configured to compare the properties of the mask fields of each of the templates to properties of the query and properties of the result and selecting the matching template. The computer system further includes a template completion module configured to complete the matching template by inserting fields of the result into corresponding mask fields of the matching template. The computer system further includes a template modification module to suppress certain mask fields when appropriate based on the results of the query. The computer system further includes a presentation module configured to present the completed matching template to a user via a display.

In an embodiment, a non-transitory computer-readable medium is configured to store instructions for selecting a grammar from among multiple grammars. The instructions, when loaded and executed by a processor, cause the processor to, responsive to receiving a result to a query, load a matching template of a plurality of templates stored in a memory. Each of the templates have mask fields associated with at least one property. The instructions compare the properties of the mask fields of each of the templates to properties of the query and properties of the result and selecting the matching template. The instructions further cause the processor to complete the matching template by inserting fields of the result into corresponding mask fields of the matching template. The instructions further cause the processor to suppress certain mask fields when appropriate based on the results of the query. The instructions further cause the processor to present the completed matching template to a user via a display.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
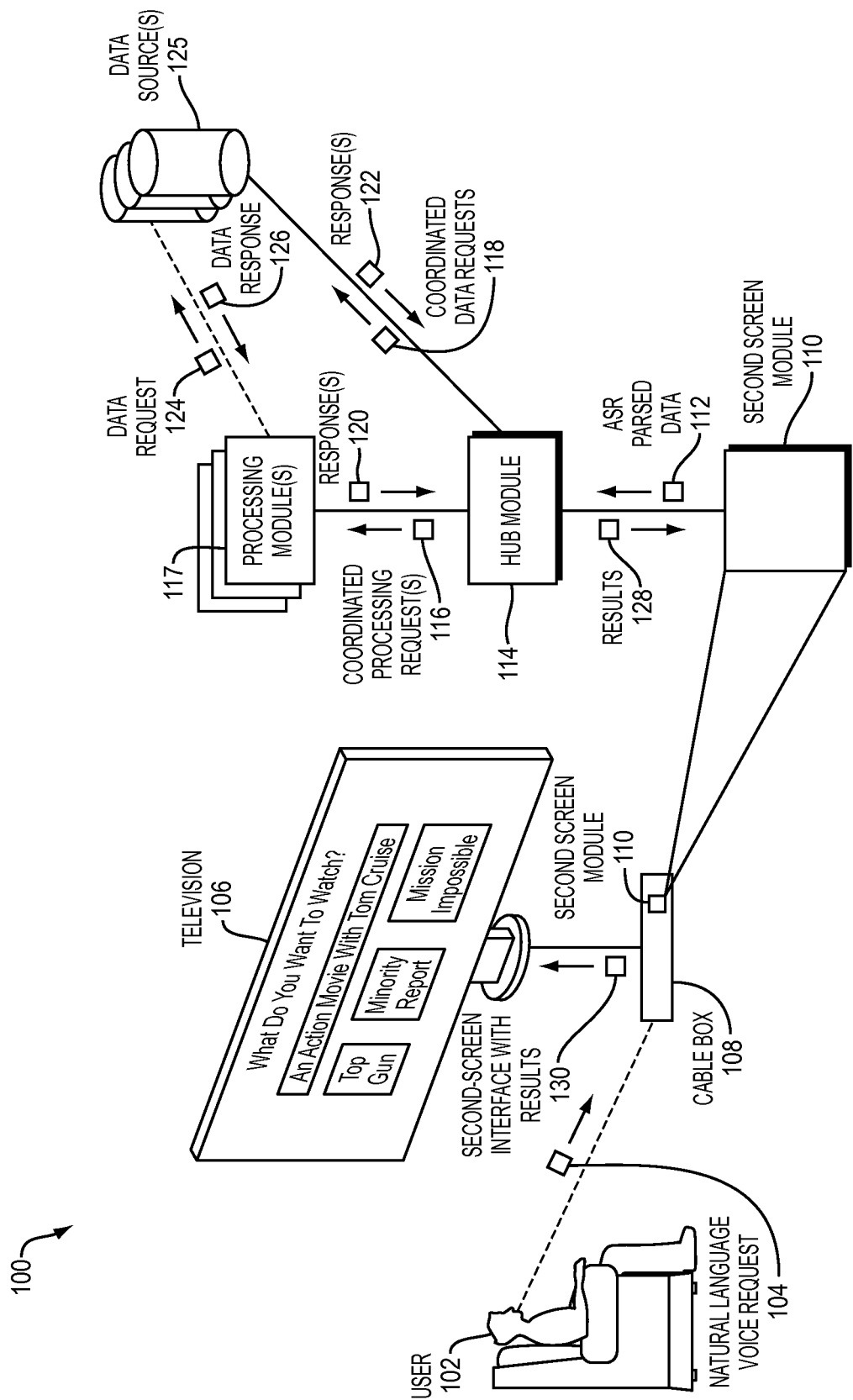
FIG. 1 is a block diagram illustrating an example embodiment of the present invention in a television/cable box context.

FIG. 1 is a block diagram 100 illustrating an example embodiment of the present invention in a television 106/cable box 108 context. A user 102 issues a natural language voice request 104, which is recorded by the cable box 108 having a second screen module 110. The second screen module 110 can also be a separate unit from the cable box 108 that operatively communicates with the cable box 108. FIG. 1 shows an embodiment having one cable box 108 and one television 106, with no separate graphical user interface (not shown) for the second-screen module 110. However, a person of ordinary skill in the art can recognize that the second-screen module 110 can have results displayed on a second screen separate from the television 106, with a user interface operatively coupled to control the media shown on the television 106. The second screen module 110 processes the natural language voice request 104 to produce automated speech recognition (ASR) parsed data 112, which is sent to a hub module 114.

The hub module 114, in one example, can be in a server over a network. The hub module 114 sends coordinated processing requests 116 to processing modules 117. The processing modules 117 can include, for example, a Named Entity Recognizer (NER), a canonicalizer, a Linguistic Processing Component (e.g., an XLE) Module, a semantic query engine, and a response generation module. The hub module 114 may also send coordinated data requests 118 to data sources 125. The data sources 125 can include knowledge bases, such as an Electronic Program Guide (EPG) and an ontology of world and domain relevant facts based on the context of the second screen module 110. The data sources 125 can also include a database of actor names, movie names, TV show names, and genre names, for example.

The hub module 114 coordinates requests to the processing modules 117 and data sources 125. Each coordinated request to the processing modules 117 and data sources 125 can be also referred to as a dialog token or message. The coordinated requests are grounded in the system's ontology. That is, each coordinated request uses data that can be read by the other processing modules 117 and data sources 125. For example, each coordinated requests can include either data in the same format of the other processing modules 117 and data sources 125, or information on how to translate the data to other processing modules 117 and data sources 125. Each coordinated request (or message or dialog token) can include multiple fields, and each of the processing modules 117 and data sources 125 can add additional fields and data to the coordinate request.

Beyond the coordinated requests themselves, the hub module 114 further coordinates requests by dynamically determining which processing module or data source to access. While the hub module 114 may include a standard or default order to send a coordinated data request to the processing, the hub module 114 can dynamically determine that it should send a coordinated data request to a module not included in the default order based on data in the coordinated data request. For example, the system may include two Canonicalization components, a primary (default) canonicalizer, and a backup canonicalizer. If the primary canonicalizer fails, the hub module 114 can analyze the message and send a second request to the backup canonicalizer, which may have a more aggressive approach to reach a result.

In addition, a downstream processing module may generate data that needs to be analyzed by an upstream module. For example, the linguistic processing module may convert the voice input "I want a movie" to "I want to watch a movie." This modified data would then need to be re-analyzed by upstream processing modules. The hub module 114 can determine that data needs to be reanalyzed and send the data to the appropriate modules for analysis/reanalysis.

Other examples of dynamically determining other modules are necessary for processing can include acquiring additional information, for example by a refresh module (not shown). The new information acquired can require new messages to be sent to modules as determined by the hub module 114.

The hub module 114 aggregates data first from the ASR parsed data, and then aggregates the response(s) 120 from the processing modules 117 and responses 122 from the data sources 125. Based on the aggregated data of the ASR parsed data 112 and responses 120 and responses 125, the hub module 114 issues coordinated processing requests 116 and coordinated data requests 118. For example, the hub module 114 may issue a first coordinated processing request 116 to a NER, and then based on the results from the NER, issues a second request to a canonicalizer. The hub module 114 then issues a third request to a Linguistic Processing Component based on the results from the canonicalizer. The hub module 114 then issues a fourth request to a Semantic Query Engine based on the results from the Linguistic Processing Component. The hub module 114 then issues a request to the response generation module, which then generates a response to the natural language voice request 104. In this manner, the hub module 114 coordinates the processing modules 117.

The hub module 114 can further coordinate the data sources 125 in a similar manner. However, the processing modules 117 can access the data sources 125 without facilitation by the hub module 114 by issuing a data request 124 to the data sources 125, and receive a data response 126. For example, the NER module may issue a data request 124 to the data source(s) for the names of actors/actresses, movies, or TV shows in one or more of its databases. The data response 126 may include one or more possible interpretations of such named entities in the ASR Parsed Data 112. In other embodiments, the hub module 114 can determine whether it should initiate the coordinated data requests 118, and receive the response(s) 122 to incorporate into its next coordinated processing requests 116.

The hub module 114, after coordinating processing requests and data requests, may determine that processing is complete and return results 128 to the second screen module 110. For example, the results 128 can be returned from a results generation module. The second screen module 110 then sends second-screen interface with results 130 to the television 106 or other display unit. The television 106 of FIG. 1 shows an example results 130 screen. The results 130 may include the initial query of the second screen module: "What do you want to watch?" The results 130 further displays the textual interpretation of the words of the user's 102 natural language voice request 104, which are "An Action Movie With Tom Cruise." The results 130 may further include the answer to the user's request 104, which are icons for the movies "Top Gun," "Minority Report," and "Mission Impossible." The user may be able to select navigation buttons to show icons in a different form (e.g., a text list, movie posters, etc.), or a scrolling button to show more titles.

Figure 2:
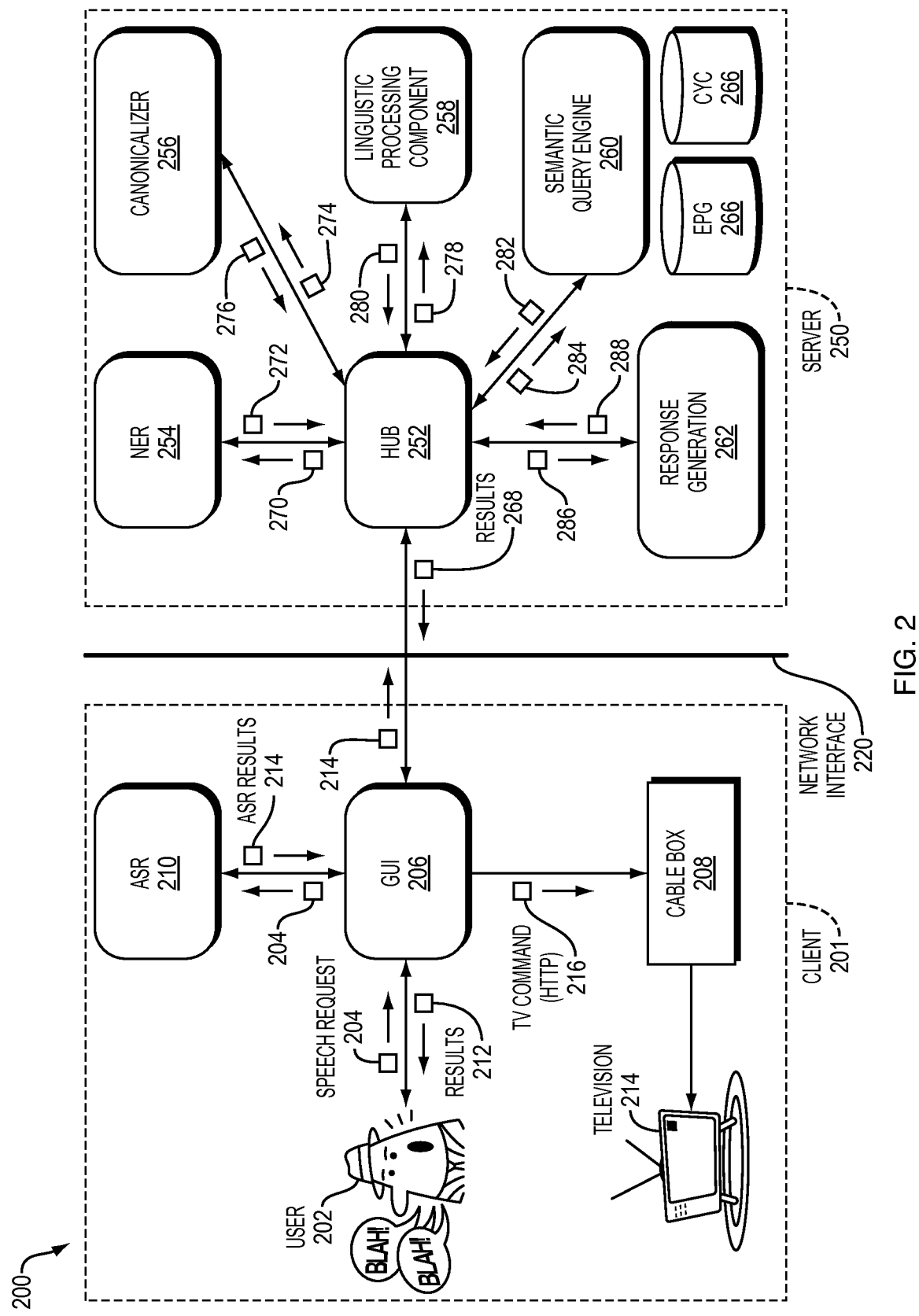
FIG. 2 is a block diagram illustrating a client interfacing with a server over a network interface as employed by an example embodiment of the present invention.

FIG. 2 is a block diagram 200 illustrating a client 201 interfacing with a server 250 over a network interface 220 as employed by an example embodiment of the present invention. A person of ordinary skill in the art can recognize that, while this embodiment employs a client/server architecture, other embodiments of the present invention exist without a client/server architecture (e.g., client-only). The client 201 includes a graphical user interface (GUI) 206 receiving a speech request 204 (e.g., a natural language speech request) from a user 202. The GUI 206 can be a smart phone, tablet, personal computer, television display, automobile head unit, etc. The GUI 206 forwards the speech request 204 to an automated speech recognition module 210, which returns ASR results 214 to the GUI 206. The client 201, via the GUI 206, forwards the ASR Results 214 to the server 250 over the network interface 220. A hub module 252 of the server receives the ASR results 214, and generates coordinated data requests 270, 274, 278, 282, and 286 to a NER 254, Canonicalizer 256, Linguistic Processing Component 258, Semantic Query Engine 260, and Response Generation Module 262, respectively.

For example, the hub 252 issues the request 270 to the NER 254 to request detection and tagging of named entities (e.g., actors, actresses, TV show names, movie show names, etc.) of the ASR results 214. The NER 254 receives the ASR results 214 from the client 201 and detects proper nouns, such as movie titles and people names, and other phrases that are not proper nouns but have significance in the TV domain (e.g., genres and time phrases). Table 2 shows an example of NER 254 input and output where the tag for each detected entity is grounded in the target ontology.

TABLE 2

Example of NER input and output.

| | |
|---|---|
| Input | a tv show with jerry seinfeld playing this weekend |
| Output | a [TVShow-CW] tv show [/] with [Person] jerry seinfeld [/] playing [CalendarDay] this weekend [/] |

In an embodiment, the NER 254 is a BIO-style tagger. The NER 254 tags each word with bX, iX, or o, which indicates, respectively, the start of entity X, the continuation of entity X, or that the word is outside any entity. The NER 254 is a machine-learned approach and may use a maximum entropy framework to predict BIO tags from annotated data. The NER 254 framework can be informed by, for example, "*Exploiting Diverse Knowledge Sources via Maximum Entropy in Named Entity Recognition*," Borthwick et al., 1998, Proceedings of the Sixth Workshop on Very Large Corpora. (hereinafter "Borthwick"), which is hereby incorporated by reference in its entirety. The model features and search algorithm employ part-of-speech tagging approach described by Ratnaparkhi, however modify the original contextual features to include: (1) all consecutive word bi-grams in a window of ±2 words (plus or minus two words) from the current word, and (2) the previous tag, and previous two tags conjoined with the current word.

The NER 254 also may use list match features to flag phrases in the utterance that match those in an externally provided dictionary. The dictionary is constructed by extracting all relevant entries (e.g., movie and TV show titles, actor names, and role names) along with their type (e.g., movie, actor, etc.) from an EPG database 264. Each word in a phrase is assigned a feature if the phrase has an exact match in the dictionary. The features are of the form bY, iY, eY, and represent the beginning, middle, and end of a phrase of type Y, respectively. A word can receive multiple list match features if it participates in multiple matches.

An embodiment of system applies the above feature patterns to the training data to create the actual feature set used by the model training. The system may be trained with a combination of real and synthetic utterances. The synthetic utterances may be employed in cases in which the real utterances alone do not cover all the anticipated linguistic phenomena. The synthetic utterances are generated using a combination of manually-authored natural language patterns and an EPG dictionary derived from a 3rd party EPG.

The NER 254, after performing the above processing, sends a response 272 to the hub module 252 having the ASR Results 214 tagged with named entities.

The hub module 252 then sends a request 274 to the Canonicalizer 256 having the tagged ASR results 214. The canonicalizer 256 maps relevant entities detected by the NER 254 to the corresponding database element based on text interpretation of the utterance. This mapping relates all tagged natural language speech requests to uniform terms for easier searching of databases. How a user may refer to an entity of interest (e.g., a movie, actor, etc.) may mismatch how the entity is encoded in the target EPG. For example, a user may refer to the second Terminator movie as "terminator two," but the EPG may encode it as "Terminator 2: Judgement Day" (e.g., the official title). The canonicalizer 256 allows the user to speak casually, without knowing the exact terms used in the EPG, for example, but still be interpreted correctly by the system.

In an embodiment, a canonicalizer 256 can be implemented using the open source search engine Apache Solr™ because it provides a wide array of fuzzy match options absent from many relational database systems, allowing fine-tuning of the match strategy. Hence, for each relevant entity (e.g., TV show, movie, actor, etc.), the canonicalizer 256 performs a fuzzy match lookup of the entity's surface form in the Solr index over the EPG table and attributes corresponding to the entity's type. Each match result can be encoded as a 3-tuple of the form <T, A, I>. T represents the table corresponding to the entity's type. A represents the attribute in T containing the unique identifier for the entity. I represents the unique identifier. For example, the tuple for "tom cruise" (an Actor type), who has an actor ID of 30914 in the EPG, has an associated canonical: <credit, name, {(type, 'Actor',=), (id, 30914,=)}>. If there are multiple matches (e.g., "Avatar" referring to both the movie and animated TV show), then the top N, based on popularity, may be returned. Additional attributes such as the popularity of the entity can also be encoded in the tuple result for other embodiments as needed.

These results are associated with their respective entity for use by downstream components to formulate a further constrained SQL query. Moreover, downstream modules need only include the identifier (and not the surface form) in the resulting SQL query, which speeds up query execution. The canonicalizer then returns results 276 to the hub module 252.

The hub module 252 then issues a request 278 to the Linguistic Processing Component 258.

In one embodiment, the application employs the XLE system as described by Maxwell ("*The Interface Between Phrasal and Functional Constraints*." Maxwell et al., 1993, Computational Linguistics 19:571-589) to implement the Linguistic Processing Component. The XLE system includes a lexical-functional grammar (LFG) parser and an integrated rule system. The XLE system parses input utterances and rewrites them into Logical Forms (LFs) grounded in the target ontology.

The LFG parser produces not just a single parse, but a packed representation as described in Maxwell ("*The Interface Between Phrasal and Functional Constraints*." Maxwell et al., 1993, Computational Linguistics 19:571-589) that compactly encodes all the viable alternative parses of the utterance (e.g., encoding multiple prepositional phrase attachments). Moreover, entities detected by the NER 254 are used to control the parsing. For example, for the input "watch tom cruise," if the NER 254 tagged "tom cruise" as a Person type, then the parser observes this tag. It therefore does not generate alternative parses for the phrase such as Tom being the subject of a cruise event, or parsing "cruise" as a separate verb. "Tom Cruise" is tagged as a proper noun, and therefore other interpretations of his name are superfluous and not generated or considered.

Xerox Transfer (XFR) rule convention rewrites the parse output into alternative LFs using, in one embodiment, three sets of rewrite rules. "*Semantics via f-Structure Rewriting*," by Crouch et al., 2006, in Proceedings of the LFG06 Conference (hereinafter "Crouch"), which is hereby incorporated by reference in its entirety, informs one example of an XFR rule system.

First, XFR rewrites the parse structure by adding word senses for each concept term (including NER entities) in the parse. These word senses can come from various lexical databases, and in this embodiment WordNet is used as the lexical database. "*A Lexical Database for English*," Miller, 1995, Communications of the ACM 38(11):39-41 (hereinafter "Miller"), which is hereby incorporated by reference in its entirety, describes WordNet further.

Second, XFR rewrites the resulting structure into alternative abstract knowledge representations (AKR) formulae, which encode the space of possible thematic roles between the concept terms based on the alternative parses from the LFG parser. "*A Basic Logic for Textual Inference*," Bobrow et al., 2005, in Proceedings of the AAAI Workshop on Inference for Textual Question Answering (hereinafter "Bobrow"), which is hereby incorporated by reference in its entirety, informs some AKR technology. The AKR formulae also use logical contexts to capture various linguistic notions, such as utterance type (e.g., question, command, etc.), disjunction, negation, etc. The AKR representation serves as an intermediate representation, thereby allowing different ontologies to be supported by different modules, hence increasing the modularity of the application and the ability for the hub module 252 to interact scalably with other modules.

Third, XFR rewrites the AKR formulae into alternative LFs in the target ontology. WordNet senses for each concept term are mapped to appropriate terms in the ontology.

The system maps thematic roles to predicates (e.g., semantic relations), and applies type-checking rules to ensure terms are compatible with the arguments of the mapped predicates, removing ill-typed alternatives. For example, the AKR representation of "play terminator two" has multiple WordNet word senses for "play," including one for playing a musical instrument and one for playing a movie. The former can be removed because "terminator two" is detected as a movie by the NER 254, and choosing a "play music instrument" type in combination with a "movie name" type triggers a type violation.

Additional structural rewrites may be performed to align better a LF alternative with the ontology (e.g., rewriting a set of binary thematic roles and their arguments into a ternary predicate).

The application may score the resulting alternative LFs using a set of heuristics that prefer the most common (e.g., frequently occurring) interpretation for the TV domain. For example, in "watch a movie with tom cruise on TV," it is unlikely that "Tom Cruise" is physically on/sitting on the TV, so this alternative is scored low and removed. Should multiple LFs (and, hence, unresolved ambiguity) remain, then one can be selected randomly as the final result. The Linguistic Processing Component 258 returns results 278 to the hub module 252.

The hub module 252 then issues a request 282 to the semantic query engine (SQE) 260. The SQE 260 formulates an SQL query based on the output of the NER 254 and Linguistic Processing Component 258 modules. There are possible two approaches to this problem:

First, learn the mappings from an utterance to a target query. "*Learning To Parse Database Queries Using Inductive Logic Programming*" Zelle et al., 1996, In AAAI/IAAI (hereinafter "Zelle") and "*Learning to Transform Natural to Formal Languages*," Kate et al., 2005, in AAAI (hereinafter "Kate"), which are hereby incorporated by reference in their entirety, inform examples of mappings.

Second, compose a query from manually defined mappings between linguistic and database elements. The SQE 260 can compose a query from manually defined mappings approach because it does not require training examples, which can be difficult to acquire at scale. However, in situations where there are sufficient training data, then the embodiment can be implemented using the first approach or a hybrid approach that combines the first and second approaches.

The SQE 260 first tries to specialize each NER 254 entity's type based on semantic relations between them produced by the Linguistic Processing Component 258, which can be implemented using specific technologies such as XLE. This compensates for fine-grained types that may be difficult for the NER 254 to detect. For example, given the utterance "movies with Tom Cruise." The NER 254 tags Tom Cruise as a Person type, and the Linguistic Processing Component 258 relates Tom Cruise to movies via a videoWorkActor relation. Hence, SQE 260 can retrieve the domain and range constraints of videoWorkActor from the underlying ontology. If this type constraint (e.g., Actor) is a subclass of the original type (e.g., Person), then the SQE 260 can specialize the type to Actor.

The SQE 260 adds structure to the entities tagged by the NER 254 by traversing the Linguistic Processing Component 258 output (e.g., in a depth-first manner) to construct a query tree.

Figure 4:
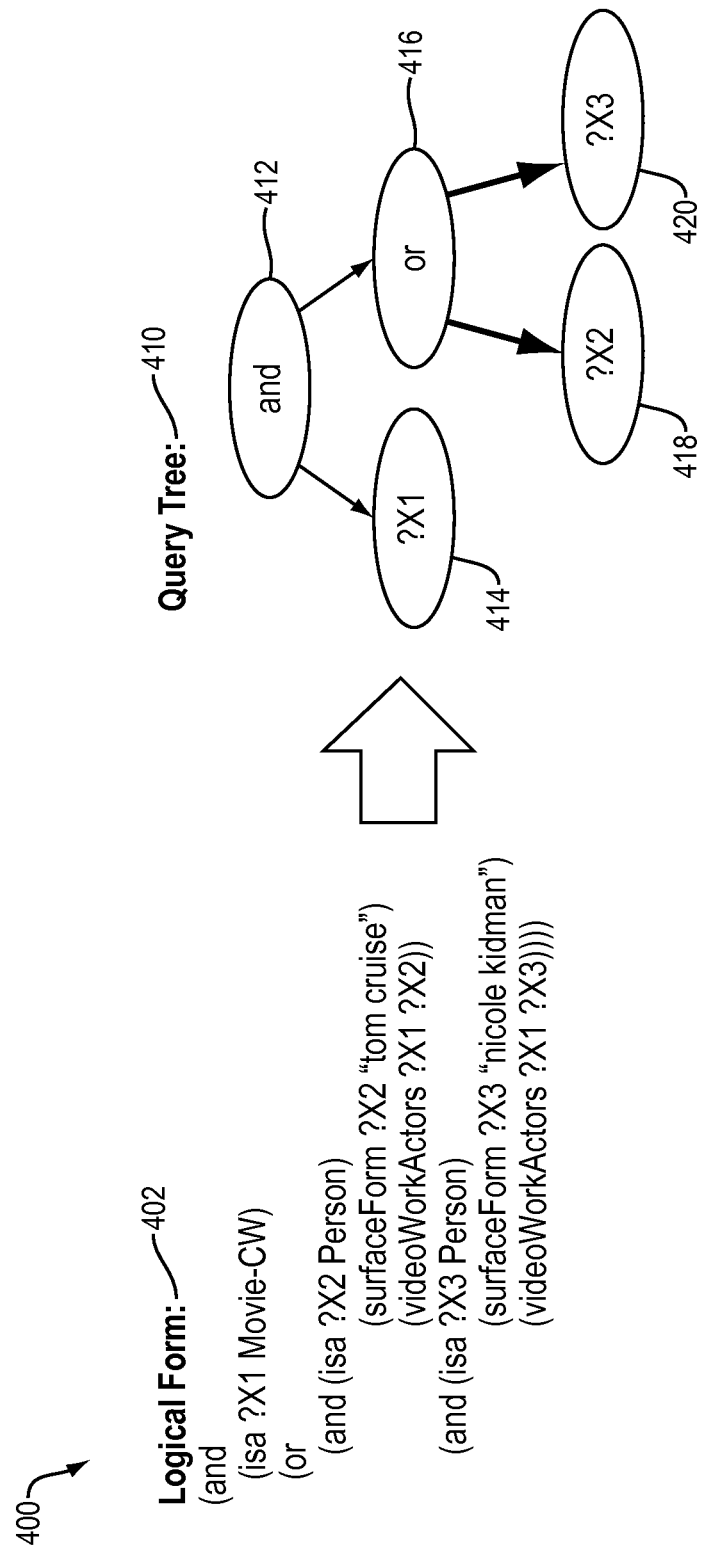
FIG. 4 illustrates a query tree and its logical form employed by an example embodiment of the present invention.

FIG. 4 illustrates a query tree 410 and its logical form 402 employed by an example embodiment of the present invention. The query generating the logical form 402 and query tree 410 of FIG. 4 is "find a movie with Tom Cruise and Nicole Kidman." Logically, this converts to finding media that is a "Movie AND has Tom Cruise OR Nicole Kidman," which is shown in logical form 402. Each logical connector (e.g., and, not, or, nor, etc.) traversed is converted into an internal node of the query tree 410. For example, the "AND" logical operator is converted into AND node 412. Each entity is converted to a leaf node, and attached to the most recent internal node traversed. Therefore, the "IS Movie?" node 414 becomes a first child of the AND node 412, and an OR node 416 becomes the second child of the AND node 412. Then, the process repeats for the OR node 416, which receives a first Actor node 418 (for Tom Cruise) and a second Actor node 420 (for Nicole Kidman). For compactness, the SQE 260 removes any AND or OR node with only one child, and its child is attached to its parent node because the result of such an AND or OR node would simply be the result of its child node. The SQE 260 uses this query tree 410 to generate and connect nested-queries.

Referring again to FIG. 2, the SQE 260 maps each entity type into an SQL fragment: a 3-tuple of the form <T, A, C>. T represents the database table to include in the "from clause" of the query. A represents relevant attributes from T to include in the "select clause" of the query. C represents a set of constraints to include in the "where clause" of the query. Each constraint C is a 3-tuple of the form (A', V, Op). A' represents the constraint attribute from T. V represents the constraint value on A' and Op represents the constraint operator (e.g., equality, membership, etc.). The mappings can be defined manually based on the target EPG database. The canonicalizer 256 results associated with the entity are also added to C.

Based on these mappings, the SQE 260 finds the shortest join path between the tables in each fragment pair via a breadth-first search over possible joins in the database. The SQE 260 also observes the structure of the query tree 410, and greedily merges fragments with overlapping database elements (e.g., tables and attributes).

Finally, the SQE 260 checks the type of the utterance produced by the Linguistic Processing Component 258. If the type is a WH-question (e.g., who, what, why, where), then SQE 260 includes the table and attribute associated with the question type in the "from" and "select" clause of the query, respectively, and extracts the return value as the answer. This strategy is sufficient because many WH-questions can be answered by applying the appropriate facet over the set of results satisfying the question constraints. The resulting SQL query is executed against the EPG 264. The semantic query engine 260 then returns results 284 to the hub module 252.

The response generation module 262 then receives a request 286. The response generation module 262 processes the request to generate a response 288 to the natural language query, which is forwarded to the hub module 252. The hub module 252 then forwards results 268 to the GUI 206 of the client 201. The GUI 206 interprets the results 268 and displays the interpreted results 212 to the user 202 in a form factor configured for the GUI 206. The user 202 may then further select one of the options of the result 212, and the GUI issues a TV Command 216 to the cable box 208, which causes the television 214 to display the media selected by the user 202.

The response generation module 262 generates responses in three categories:

(1) Confirmation Prompts: A confirmation prompt is a restatement of the constraints requested by the user. With possibly noisy ASR 210 and NER 254, confirmations let the user know whether the application understands his/her request correctly. In cases where no results are found, the system also indicates this. This way, the user 202 can repeat or rephrase the speech request 204 if no results are found or if the application misinterprets the user's words.

(2) Answers: The application presents possible answers found for WH-questions posed by the user. The systems performs processing, such as converting the time represented in the EPG 264 to local time, based on the question type.

(3) Exception Responses: The application presents responses to inform the user of exception conditions (e.g., the NER 254 did not detect any entities, no answers were found for a question, etc.).

In an embodiment, the response generation module 262 generates concise prompts using templates, the Simple Natural Language Generation (SimpleNLG) package as described in Gatt, cited above, and transformation heuristics. SimpleNLG enforces common grammatical constraints such as number, noun-verb, and article-noun agreement. The system selects an appropriate predefined set of SimpleNLG syntax tree templates based on the slots and values needed to be expressed in the prompt. The system instantiates the selected template appropriately, and applies relevant transformations (e.g., suppressing portions of the template) based on the context (e.g., number of results, result type, etc.).

For example, if the NLG component is asked to generate a prompt for the slot-value tuple (genre="romantic comedy", type="movie or tv show"), it suppresses the type slot if the result includes both movies and tv comedies and generates a response "romantic comedies" whereas a pure template-based approach generates the more verbose response "romantic comedy movies or TV shows." This strategy allows the system to better handle variation, brevity, and fluency of natural English.

Further, previous efforts have utilized one linguistic component. The hub module 252 of present system interacts with multiple linguistic components (e.g., the NER 254, the canonicalizer 256, and the Linguistic Processing Component 258). The hub module 252 coordinates requests among multiple modules to manage different ontologies and generate a real world result for the user based on real world input, which is novel and a unique challenge overcome by embodiments of the present invention.

Figure 3A:
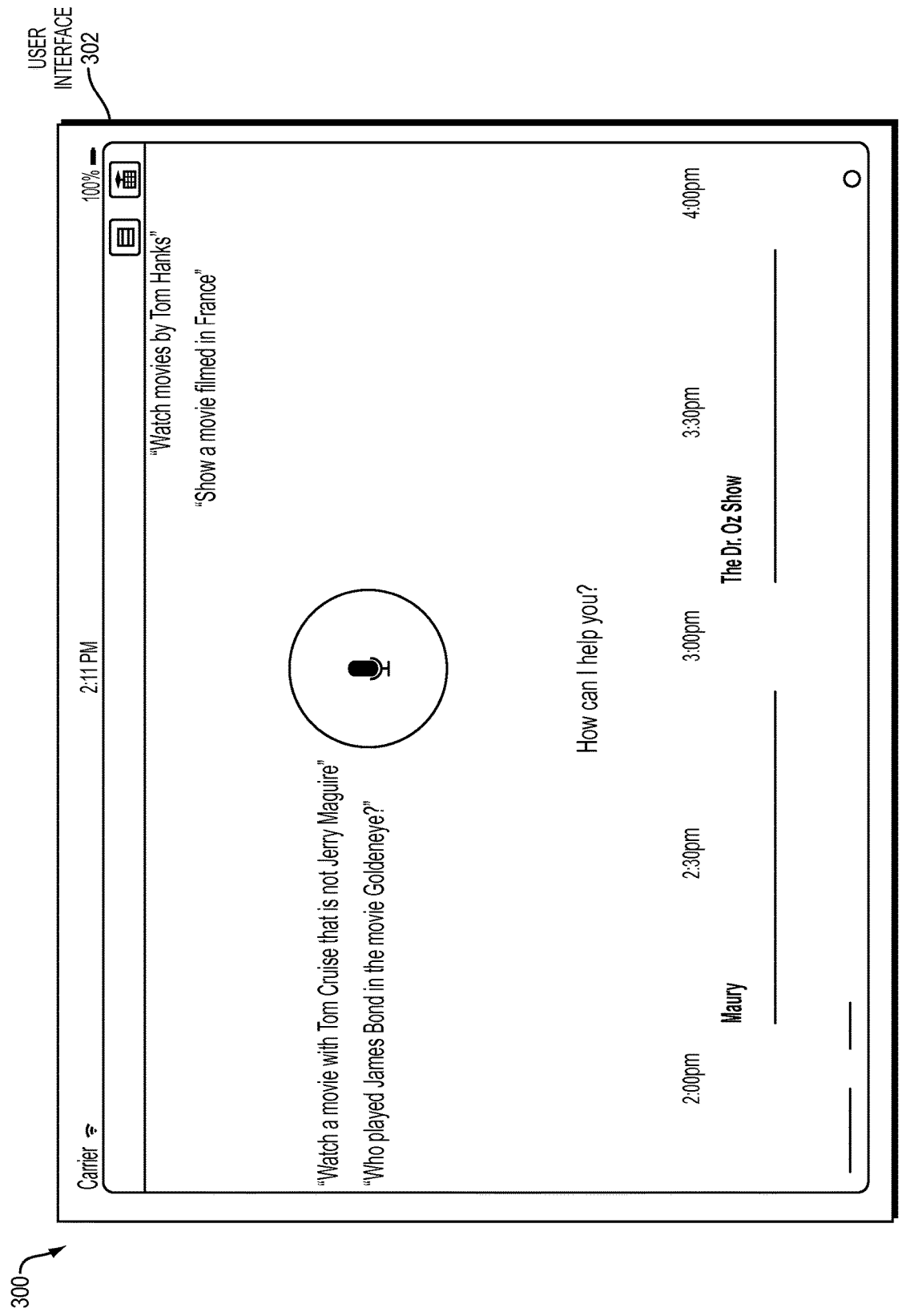
FIGS. 3A-B are diagrams illustrating user interfaces employed by example embodiments of the present invention.
Figure 3B:
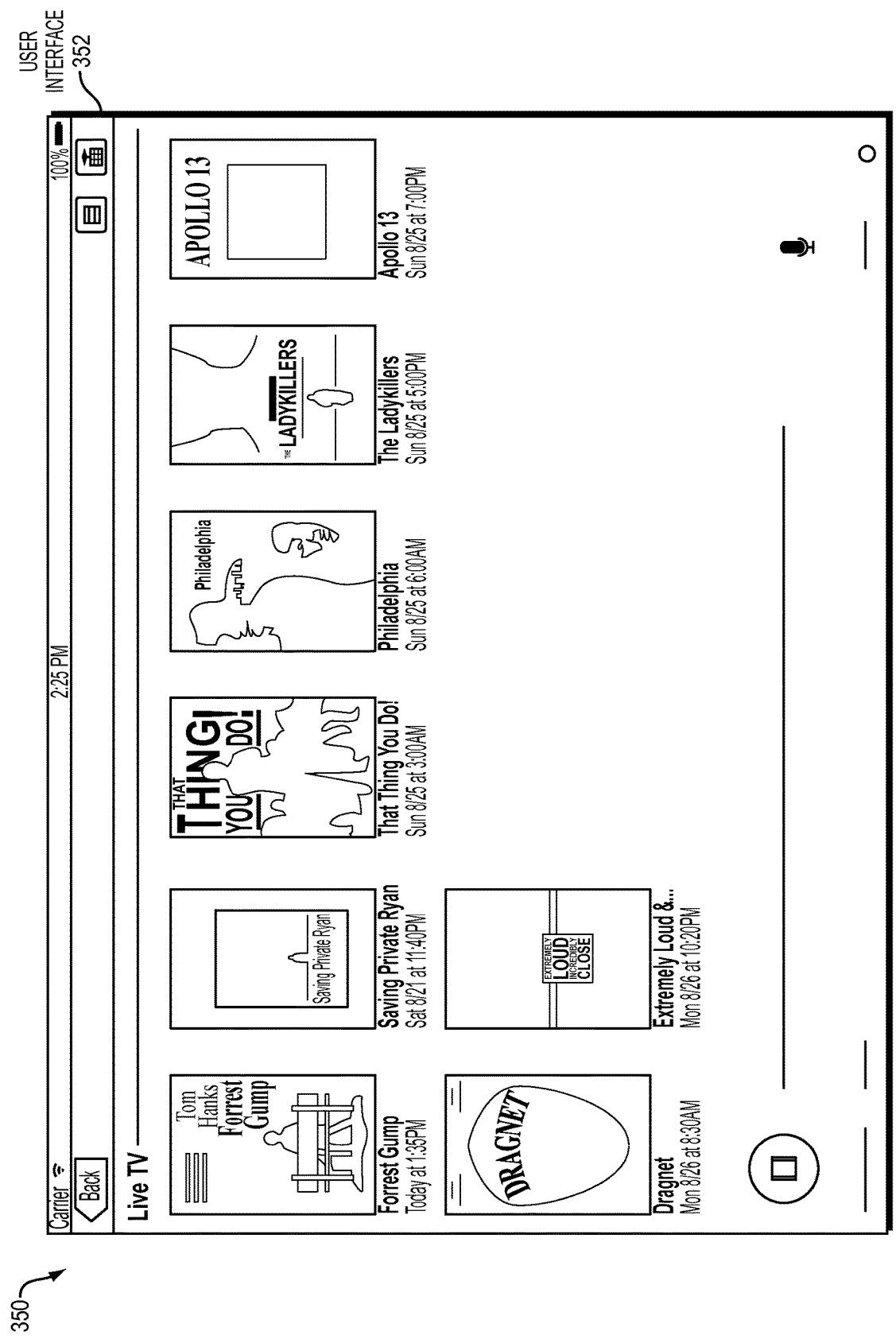

FIGS. 3A and 3B are diagrams 300 and 350, respectively, illustrating user interfaces 302 and 352 employed by example embodiments of the present invention. The user interface 302 of FIG. 3A shows the system as it is receiving speech input from the user. The user can tap the microphone icon in the user interface to activate the system's recording device. In another embodiment, the system's recording device can be activated upon hearing speech.

In relation to FIG. 3B, a diagram 350 illustrating user interface 352 shows results of a user query. The user query of FIG. 3B and user interface 352 is "watch a movie with tom hanks" Therefore, several movies starring Tom Hanks are shown in the user interface 352. The user can further select one of the shown movies by further voice command or other input.

Figure 5:
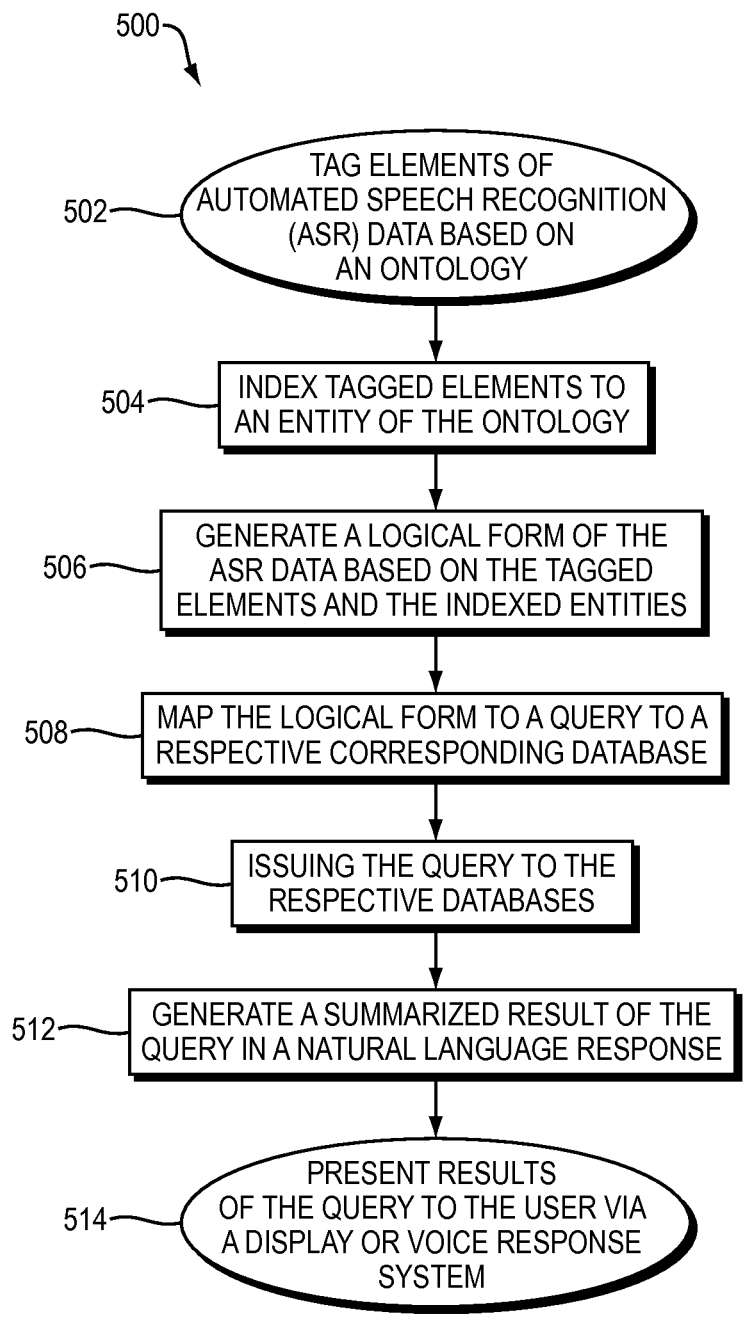
FIG. 5 is a flow diagram illustrating an example embodiment of process employed by the present invention.

FIG. 5 is a flow diagram 500 illustrating an example embodiment of process employed by the present invention. The process is coordinated by a hub module (see, e.g., FIGS. 1-2). The hub module is informed by an ontology stored in a memory, and can organize requests to a scalable number of modules by relating each request to entries in the ontology. The method first tags elements of automated speech recognition (ASR) data based on an ontology stored in a memory (e.g., at a named entity recognizer/NER) (502). The method then indexes tagged elements to entities in the ontology (e.g., at a canonicalizer module) (504). The method then generates a logical form of the ASR data based on the tagged elements and the indexed entities (e.g., at a linguistic processing component such as an XLE) (506). The method then maps the logical form a query to a respective corresponding database stored in the memory (e.g., the semantic query engine) (508). The method then issues the query to the respective corresponding databases (e.g., at a semantic query engine) (510). The method then generates a summarized result of the query in a natural language response (e.g., at a response generation module) (512). The method further presents results of the query to the user via at least one of a display or a voice response system (514) (e.g., at a response generation module).

Figure 6:
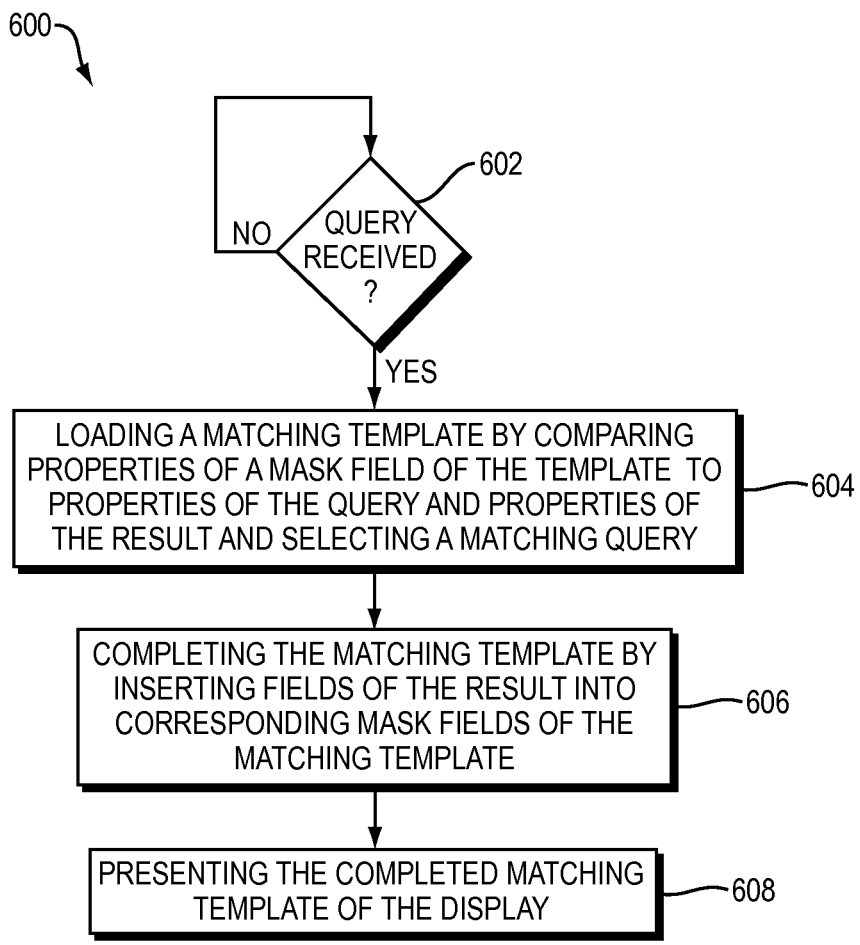
FIG. 6 is a flow diagram of an example embodiment of a process employed by the present invention performed by the results generation module (e.g., of FIG. 2).

FIG. 6 is a flow diagram 600 of an example embodiment of a process employed by the present invention performed by the results generation module (e.g., of FIG. 2). First, the process determines whether a query is received (602). If not, the process waits until a query is received (602). If a query is received, however, the response generation module loads a matching template by comparing the properties of the mask fields of each of the plurality of templates to properties of the query and properties of the result and selecting the matching template (604).

Each of the plurality of templates have one or more mask fields associated with at least one property. The response generation module then completes the matching template by inserting fields of the result into the corresponding mask fields of the matching template (606). The response generation module then presents the completed matching template on the display (608).

Figure 7:
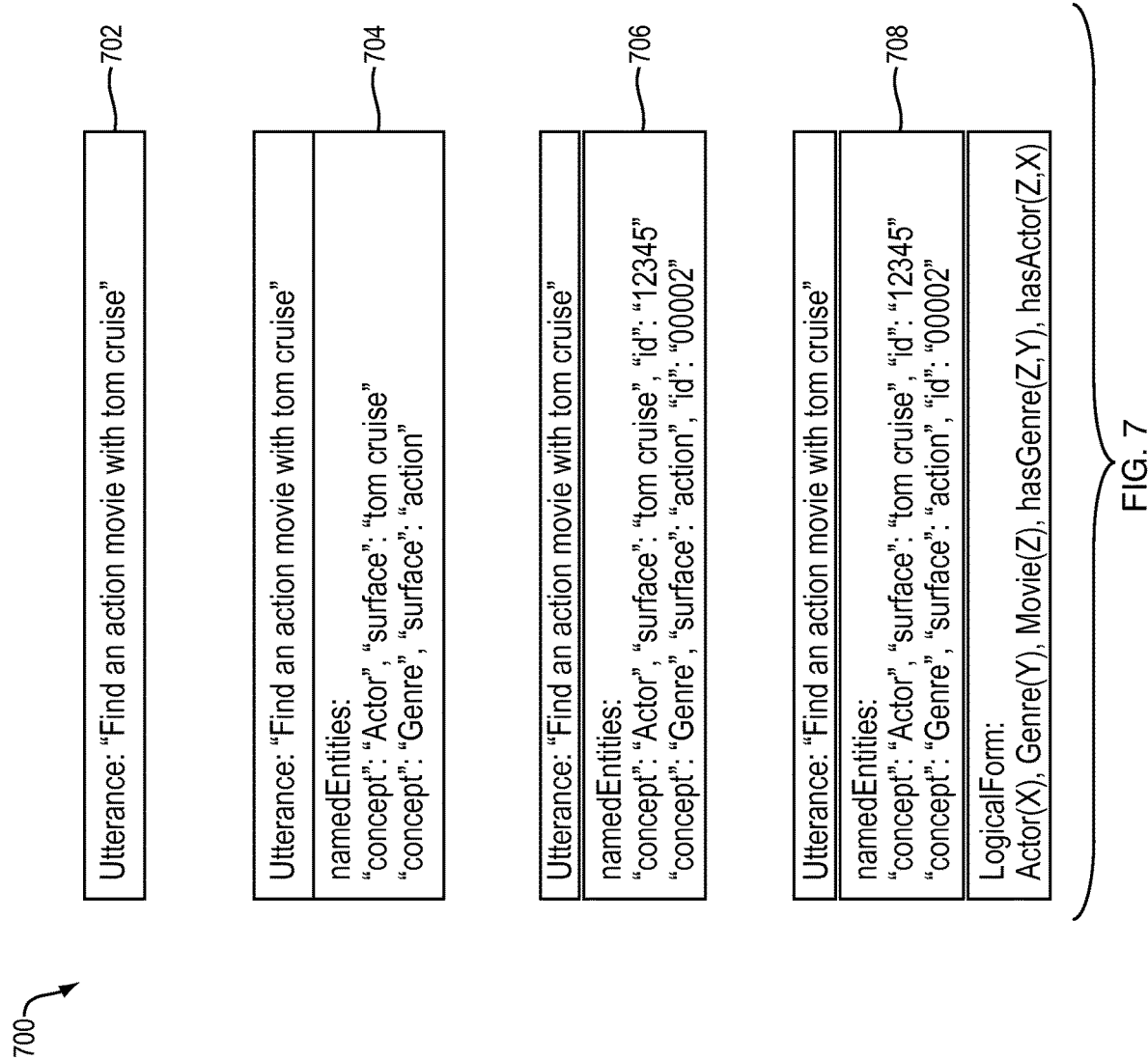
FIG. 7 illustrates an example embodiment of coordinated processing requests.

FIG. 7 is a diagram 700 illustrating an example embodiment of a coordinated processing request (e.g., dialog token or message). A first coordinated processing request 702 includes an utterance, "Find an action movie with tom cruise." The hub module, as described above, can generate the initial coordinated processing request 702 from output from an automated speech recognition (ASR) service.

The hub module can then send the initial coordinated processing request 702 to a named entity recognizer, which appends a named entity field to the initial coordinated processing request 702, creating coordinated processing request 704. Coordinated processing request 704 includes data from the named entity recognizer, such as ["concept": "Actor", "surface": "tom cruise"], indicating that the actor requested is Tom Cruise, and ["concept": "Genre", "surface": "action"], indicating that the genre requested is Action. Upon receiving the coordinated processing request 704 from the NER, the hub module analyzes the coordinated processing request 704 and determines to send it to the canonicalizer.

The canonicalizer receives coordinated processing request 704 and appends each named entity with a corresponding ID number to generate coordinated processing request 706. The updated named entity fields of coordinated processing request 706 then become ["concept": "Actor", "surface": "tom cruise", "id": "12345"], indicating that Tom Cruise's ID in the system is 12345, and ["concept": "Genre", "surface": "action", "id": "00002"], indicating that the "action" genre ID in the system is 00002. This allows better coordination with other components such as an electronic program guide.

The hub module then determines a logical form of the input should be generated and sends the coordinated processing request 706 to the linguistic processing module. The linguistic processing module generates a logical form and appends it to the coordinated processing request 706, giving coordinated processing request 708. The logical form, in this example, is Actor(X), Genre(Y), Movie(Z), hasGenre(Z,Y), hasActor(Z,X), which allows a query to be generated to search for the requested movies.

Figure 8:
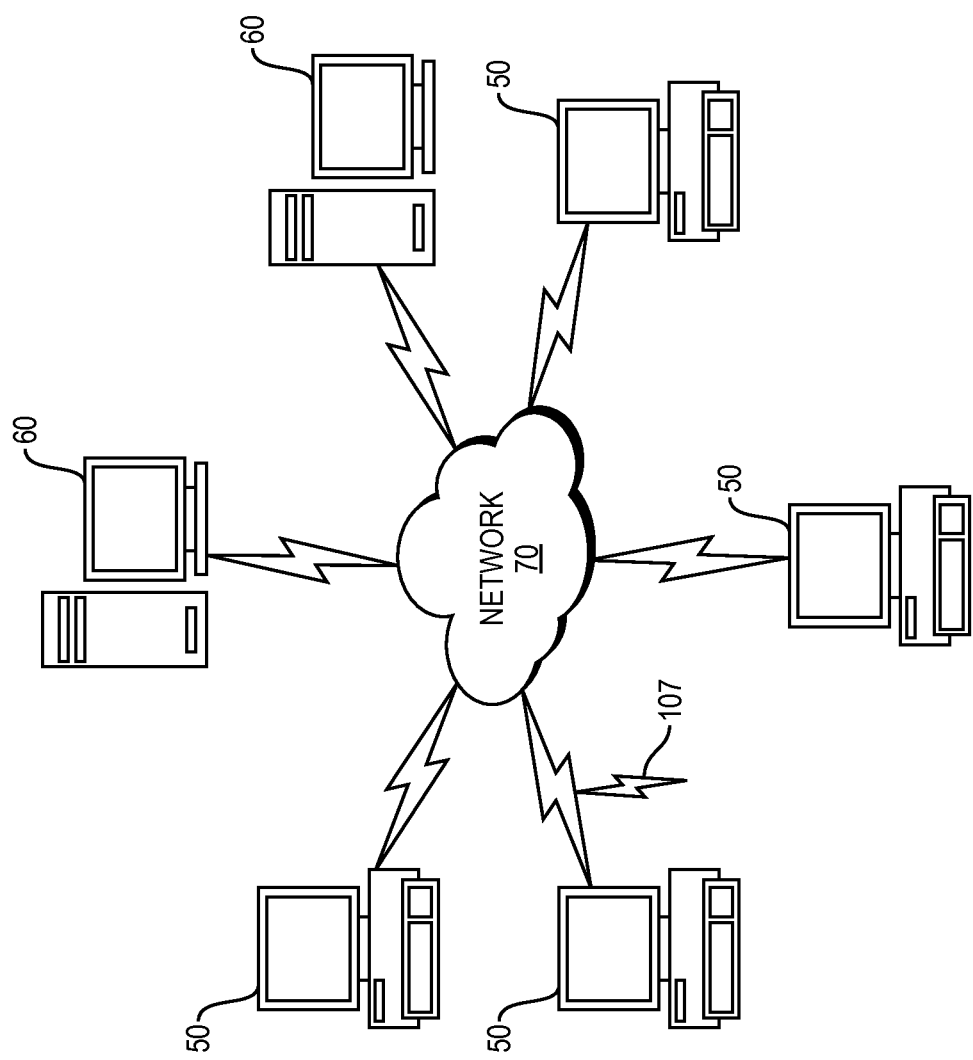
FIG. 8 illustrates a computer network or similar digital processing environment in which embodiments of the present invention may be implemented.

FIG. 8 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 9:
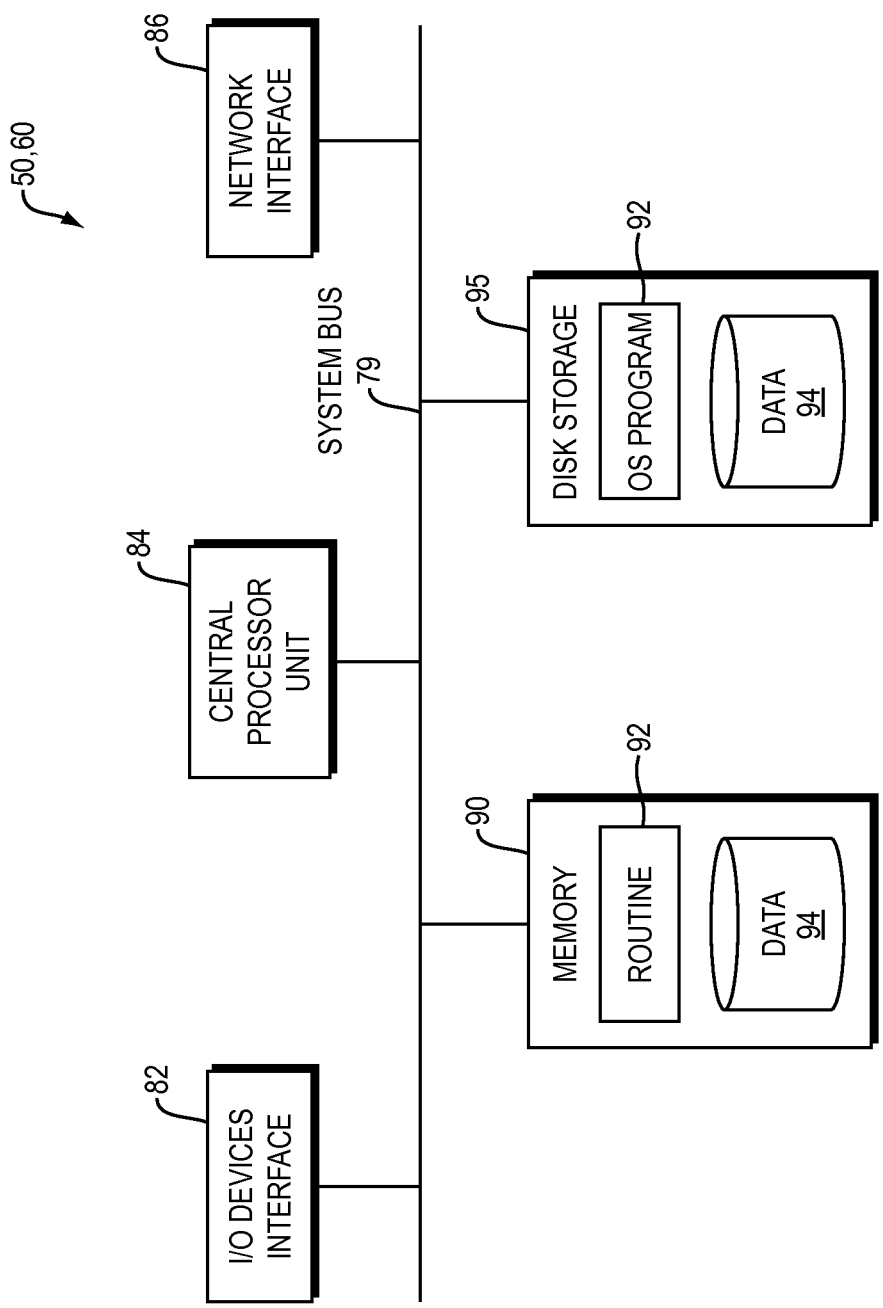
FIG. 9 is a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present invention (e.g., naming entity module, canonicalizer module, linguistic parser module, semantic query engine, response module, and user interface module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method comprising:
responsive to receiving a result from a natural language understanding system that generated the result as a response to a natural language query received from a user via a user interface:
selecting a matching template of a plurality of templates stored in a memory by comparing one or more properties associated with one or more mask fields of one or more of the plurality of templates with (a) one or more properties of the natural language query and (b) one or more properties of the result of the natural language query;
completing the matching template by inserting fields of the result received in response to the query into corresponding mask fields of the matching template; and
outputting the matching template completed to present the matching template to the user via the user interface.

2. The computer-implemented method of claim 1, wherein the properties of the result correspond with respective fields of the result.

3. The computer-implemented method of claim 1, wherein properties of the query correspond with respective fields of the query.

4. The computer-implemented method of claim 1, wherein selecting the matching template further includes assigning a score to the properties of the mask fields respective to properties of the query and properties of the result, and combining the scores of the mask fields of each of the plurality of templates, and
wherein selecting the matching template further includes selecting a highest scoring template of the plurality of templates.

5. The computer-implemented method of claim 1, further comprising suppressing a redundant or extraneous mask field of the completed matching template.

6. The computer-implemented method of claim 5, wherein suppressing a redundant or extraneous mask field further includes identifying redundant information in the result and identifying a matching template using the identified redundant information once.

7. The computer-implemented method of claim 5, wherein suppressing a redundant or extraneous mask field further includes blocking insertion of a field of the result into the corresponding masked field of the matching template when the values of the blocked field of the result is determined to contain information above a particular threshold.

8. The computer-implemented method of claim 1, wherein loading the matching template includes providing a score bonus to templates suppressing the redundant mask field in the result.

9. A computer system comprising:
a processor; and a memory with computer code instructions stored thereon, the processor and the memory, with the computer code instructions being configured to:

responsive to receiving a result from a natural language understanding system that generated the result as a response to a natural language query received from a user via a user interface, select a matching template of a plurality of templates stored in a memory by comparing one or more properties associated with one or more mask fields of one or more of the plurality of templates with (a) one or more properties of the natural language query and (b) one or more properties of the result of the natural language query;

complete the matching template by inserting fields of the result received in response to the query into corresponding mask fields of the matching template; and output the matching template completed to present the matching template to the user via the user interface.

10. The computer system of claim 9, wherein the properties of the result correspond with respective fields of the result.

11. The computer system of claim 9, wherein properties of the query correspond with respective fields of the query.

12. The computer system of claim 9, wherein the computer code instructions are further configured to cause the processor to select the matching template further by assigning a score to the properties of the mask fields respective to properties of the query and properties of the result, and combine the scores of the mask fields of each of the plurality of templates, and wherein selecting the matching template further includes a highest scoring template of the plurality of templates.

13. The computer system of claim 9, wherein the computer code instructions are further configured to cause the processor to suppress a redundant or extraneous mask field presented in the completed matching template.

14. The computer system of claim 13, wherein the computer code instructions are further configured to cause the processor to suppress a redundant mask field by identifying redundant information in the result and identifying a matching template using the identified redundant information once.

15. The computer system of claim 13, wherein computer code instructions are further configured to cause the processor to suppress a redundant mask field by blocking insertion of a field of the result into the corresponding masked field of the matching template when the values of the blocked field of the result is determined to contain information above a particular threshold.

16. The computer system of claim 9, wherein loading the matching template includes providing a score bonus to templates suppressing redundant information in the result.

17. A non-transitory computer-readable medium configured to store instructions for selecting a grammar from among multiple grammars, the instructions, when loaded and executed by a processor, cause the processor to:

responsive to receiving a result from a natural language understanding system that generated the result as a response to a natural language query received from a user in a user interface:

select a matching template of a plurality of templates stored in a memory by comparing one or more properties associated with one or more the mask fields of one or more of the plurality of templates with (a) one or more properties of the natural language query and (b) one or more properties of the result to the natural language query;

complete the matching template by inserting fields of the result received in response to the query into corresponding mask fields of the matching template; and output the matching template completed to present the matching template to the user via the user interface.

18. The non-transitory computer-readable medium of claim 15, wherein the properties of the result correspond with respective fields of the result.

19. The non-transitory computer-readable medium of claim 15, wherein properties of the query correspond with respective fields of the query.

20. The non-transitory computer-readable medium of claim 15, wherein selecting the matching template further includes assigning a score to the properties of the mask fields respective to properties of the query and properties of the result, and combining the scores of the mask fields of each of the plurality of templates, and wherein selecting the matching template further includes selecting a highest scoring template of the plurality of templates.

* * * * *